United States Patent Office 3,836,498
Patented Sept. 17, 1974

3,836,498
POLYAMIDES AND THEIR ANISOTROPIC DOPES
Leslie W. Gulrich, Jr., Wilmington, Del., and Paul Winthrop Morgan, West Chester, Pa., assignors to E. I. du Pont de Nemours and Company, Wilmington, Del.
No Drawing. Filed Oct. 27, 1972, Ser. No. 301,290
Int. Cl. C08g 20/00, 51/46
U.S. Cl. 260—30.8 R      4 Claims

ABSTRACT OF THE DISCLOSURE

Novel film- and fiber-forming aromatic polyamides and copolyamides consisting essentially of repeating units of the formula

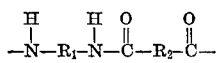

wherein $R_1$ represents at least one radical selected from the group of 1,4-phenylene; methyl-, chloro-, bromo- and fluoro-1,4-phenylene; 4,4' - biphenylene; 3,3'-dichloro-4,4'-biphenylene; 3,3'-dimethoxy - 4,4' - biphenylene; 3,3'-dimethyl - 4,4' - biphenylene; trans-1,4-cyclohexylene; 4,4' - carbonamidobiphenylene; and 1,4-phenylene bis-(iminocarbonyl)-1,4-phenylene; and $R_2$ represents 2,5-pyridylene or 4-methyl-2,5-pyridylene radicals, of which 0 to about 50 mole percent may be replaced by radicals selected from the group of 1,4-phenylene, chloro-1,4-phenylene, and 4,4'-biphenylene. These polymers form useful anisotropic spinning dopes with concentrated sulfuric acid.

---

This invention relates to novel, film- and fiber-forming aromatic polyamides containing enchained 2,5-pyridylene units.

BACKGROUND OF THE INVENTION

The preparation of polyamides from derivatives of 2,5-pyridinedicarboxylic acid, derivatives of aliphatic acids, and aliphatic diamines is taught in British Patent Specification 830,799. The preparation of low molecular weight polyamides from 2,6-pyridinedicarbonyl chloride and aromatic diamines is taught by Terentev et al. in "Polymer Science (U.S.S.R.)" (English Translation) 4, 1556–1560 (1963). Anisotropic spinning dopes and high strength fibers of carbocyclic aromatic polyamides are taugh in Kwolek U.S. 3,671,542.

SUMMARY OF THE INVENTION

This invention provides novel film- and fiber-forming aromatic polyamides and copolyamides consisting essentially of repeating units of the formula (I) 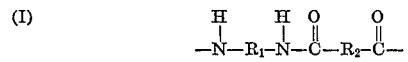

wherein $R_1$ represents at least one radical selected from the group of 1,4-phenylene; methyl-, chloro-, bromo- and fluoro-1,4-phenylene; 4,4' - biphenylene; 3,3'-dichloro-4,4'-biphenylene; 3,3'-dimethoxy - 4,4' - biphenylene; 3,3'-dimethyl - 4,4' - biphenylene; trans-1,4-cyclohexylene; 4,4' - carbonamidobiphenylene; and 1,4-phenylene bis-(iminocarbonyl)-1,4-phenylene; and $R_2$ represents 2,5-pyridylene or 4-mthyl-2,5-pyridylene radicals, of which 0 to about 50 mole percent may be replaced by radicals selected from the group of 1,4-phenylene, chloro-1,4-phenylene, and 4,4'-biphenylene.

Useful formula (I) polyamides and copolyamides exhibit inherent viscosity values of at least 1.0, preferably 2.0 or higher, measured as described hereinafter.

Preferably, formula (I) polyamides and copolyamides are prepared by the reaction between diamines of the formula (II–A)        $H_2N-R_1-NH_2$ and diacid chlorides of the formula (II–B) 

wherein $R_1$ and $R_2$ have the significance set forth hereinbefore.

This invention also provides novel, optically anisotropic dopes which are prepared from formula (I) polyamides and copolyamides and concentrated sulfuric acid within the concentration range of about 93–105% $H_2SO_4$, preferably about 96–102%.

DESCRIPTION OF THE PREFERRED EMBODIMENTS

Useful Polyamides and Copolyamides

The polyamides and copolyamides of this invention may be prepared by low temperature solution polymerization processes similar to those described in, e.g., Kwolek U.S. 3,063,966. In this process, a cooled (e.g., with ice, ice-water, solid carbon dioxide) stirred solution of a formula (II–A) diamine, or mixture of diamines, is formed in a basic solvent system, e.g., a mixture of hexamethylphosphoramide (HMPA) and N-methylpyrrolidone-2 (NMP). Other useful media are HMPA alone, N,N-dimethylacetamide (DMAc), N,N,N',N' - tetramethylurea (TMU), and mixtures thereof. 2,5-pyridinedicarbonyl chloride and/or 4-methyl-2,5-pyridinedicarbonyl chloride or mixtures thereof with a suitable formula (II–B) comonomer, e.g., terephthaloyl chloride, is then added rapidly to the diamine solution. The diacid chlorides need not be mixed prior to their addition to the diamine solution, but may be added separately. The reaction mixture may be stirred and/or allowed to stand until the desired degree of polymerization has been achieved. Frequently, the reaction mixture becomes a difficultly stirrable mass within a relatively short period of time after addition of the acid chlorides. For some combinations of intermediates the addition of anhydrous lithium chloride or calcium chloride to the amide medium, or the generation of such salts during or near the end of the polymerization by addition of appropriate bases, is beneficial in increasing the molecular weight of the product. It is convenient to obtain the polymeric product by combining the reaction mixture, e.g., as a viscous solution or solid mass, with a polymer nonsolvent, e.g., water, after which the polymer is collected by filtration, washed (e.g., with water, acetone, alcohol), and dried prior to being dissolved to form the dopes of this invention. During polymerization, the acidic hydrogen chloride by-product generated by the condensation reaction may be neutralized by adding to the reaction mixture a suitable neutralizing agent, e.g., lithium carbonate.

The polyamides and copolyamides of the invention may also be prepared by conventional interfacial polymerization techniques. For example, to a stirred combination of water, the diamine, an inorganic base (e.g., sodium carbonate), and a water immiscible liquid is added the diacid chloride dissolved in the same water-immiscible liquid. After the reaction has been completed, the contents of the reaction vessel are combined with a polymer nonsolvent. The precipitated polymer is collected, washed, and dried, as shown above. Alternatively, selected water-miscible or partially water-miscible solvents, e.g. tetrahydrofuran or cyclohexanone, may be used in an interfacial system.

Formula (II–A) diamines useful for preparing the polyamides and copolyamides of this invention include 1,4-phenylenediamine; chloro-, bromo- and fluoro-1,4-phenylenediamines; methyl-1,4-phenylenediamines; benzidine, 3,3'-dimethylbenzidine; 3,3'-dimethoxybenzidine; *trans* - 1,4 - cyclohexanediamine; 4,4'-diaminobenzanilide; and N,N'-bis(4-aminobenzoyl) - 1,4 - phenylenediamine. Formula (II–B) diacid chlorides useful in this invention are 2,5-pyridinedicarbonyl chloride or 4-methyl-2,5-pyridinedicarbonyl chloride, and their combination with chloroterephthaloyl chloride, terephthaloyl chloride, or 4,4'-bibenzoyl chloride.

Preferred formula (I) polyamides are poly(chloro-1,4-phenylene 2,5-pyridinedicarboxamide) and poly(1,4-phenylene 2,5-pyridinedicarboxamide). Other useful polymers include poly(4,4'-biphenylene 2,5-pyridinedicarboxamide), poly(3,3'-dimethyl-4,4'-biphenylene 2,5-pyridinedicarboxamide), poly(methyl-1,4-phenylene 2,5-pyridinedicarboxamide), poly(3,3'-dimethoxy - 4,4' - biphenylene 2,5-pyridinedicarboxamide), poly(1,4-phenylene 4-methylpyridinedicarboxamide), and poly(3,3'-dimethyl-4,4'-biphenylene 4-methyl-2,5-pyridinedicarboxamide).

Additionally, up to a total of about 10 mole percent of the repeating units in the useful copolyamides of this invention may be derived from reactants which do not conform to the formula (II–A) or (II–B). These reactants, used in appropriate amounts, may be polyamide-forming aromatic monomers possessing both amine and acid chloride groups (e.g., para-aminobenzoyl chloride hydrochloride); diamines and diacid chlorides characterized by ring-atom-ring structures [e.g., bis(4-aminophenyl)ether and bis(4-chlorocarbonyl phenyl)ether]; and aliphatic diacid chlorides characterized by 4–12 carbon atoms (e.g., adipyl chloride, sebacyl chloride). When meta-oriented aromatic diamines and diacid chlorides (e.g., m-phenylenediamine and isophthaloyl chloride) are employed as coreactants, preferably no more than about 5 mole percent of the repeating units are derived from these meta-oriented comonomers.

In preparation of the polyamides and copolyamides useful in this invention, chain terminators may be used. Among suitable chain terminators are compounds which can react monofunctionally with the acid chloride ends of these polymers, such as ammonia, ethylamine, dimethylamine, diethylamine, aniline, etc. Other terminators include hydroxylic compounds such as methyl alcohol, ethyl alcohol, isopropyl alcohol, and phenol. Useful terminators which react monofunctionally with the amine ends of these polymer chains include acid chlorides, e.g., acetyl chloride, acid anhydrides, e.g., acetic anhydride, and isocyanates, e.g., phenyl isocyanate.

Useful Solvents

Anisotropic dopes of polymers of this invention can be prepared using as solvent, concentrated sulfuric acid within the concentration range of about 93–105%, preferably 96–102%. Optical anisotropy is described in detail in Kwolek U.S. 3,671,542. It is believed that polyamides prepared from derivatives of 2,6-pyridinedicarboxylic acid will not yield anisotropic dopes and hence cannot be used to prepare the high strength fibers which are obtained from polymers of the present invention.

Dope Preparation

Anisotropic spinning dopes from the polymers of this invention are prepared by first combining under anhydrous conditions and with stirring and mixing, suitable quantities of the appropriate polymer or copolymer with the sulfuric acid to form compositions containing from about 7 to 20% by weight polymer or copolymer, preferably about 10–20% by weight. Generally, during addition of the polymer, the heat of mixing should be controlled in order that the temperature of the combined ingredients does not exceed 90° C., preferably not over 60–70° C. This may be accomplished by using cooled quantities of acid, application of external cooling baths to the mixing vessel, controlled rate of addition of the solid polymeric material, appropriate stirring action, and/or combinations of these procedures. However, in some instances, as illustrated in the examples which follow, it may be desirable to mix the ingredients with a moderate degree of heating in order to achieve more rapid dissolution of the polymeric solid. During preparation of the dope and the spinning thereof, the dopes should be maintained at temperatures which reduce the opportunity for polymer degradation to occur.

The anisotropic dopes may become isotropic when warmed to temperatures well beyond that needed to prevent any solidification. This state is apparent in that shear opalescence is absent and the dope does not transmit light when viewed between crossed polarizers.

Since excessive water can interfere with the formation of dopes suitable for spinning and can contribute to degradation of the polymer, dopes should be prepared with relatively dry polymer samples under conditions where exposure to atmospheric moisture is minimized, e.g., under a blanket of dry nitrogen.

After being initially prepared, the dopes may be very viscous. Processing them into shaped articles, e.g., fibers, may be facilitated by increasing their fluidity by means of adequate stirring or other shearing action. One type of apparatus which is useful for increasing the fluidity of these dopes prior to spinning or casting is referred to herein as a "twin-cell unit" and is described below, together with fluid transfer and spinning equipment. This apparatus, into which the initially prepared dope is placed, consists of two open top cylinders (each of about 250 ml. capacity) connected by a base block. Each cylinder has a hole in its base above a filter pack [3/20-mesh screens/2/100-mesh screens/1/325-mesh screen/2/100-mesh screens/2/20-mesh screens (mesh/inch=mesh/2.54 cm.)] in the base block which leads to a passage in the block to the other filter pack and cylinder. The mixing device is fitted to a pair of pistons which closely fit each cylinder. A small hole in each piston is opened for the initial fitting by each piston to insure the removal of air and is then closed. A water bath, e.g., at about room temperature to about 80° C., is placed around the mixing device. During the course of about 1 to 2 hours the dope is pushed by the pistons from one cylinder to the other for several cycles, e.g., 8–15 cycles. With all of the dopes in one cylinder (and the connecting passage), the mixing device is connected through a hole (previously plugged) in the base block leading to the connecting passage by a length of stainless steel tubing in the shape of a goose neck to an electrically heated spinning block having a filter pack composed of /1/20-mesh screen/1/disc of Dynalloy® filter material (X–5), product of Fluid Dynamics Co., Morristown, N.J., /2/100 mesh-screens/ 1/325-mesh screen/2/100-mesh screens and an appropriately selected spinneret. The water bath is replaced around the mixing device and the tubing. The short length of the tubing between the water bath and the spinning block which may be heated is insulated with glass wool. The dope is then extruded from the spinneret, as shown in a following section.

Anisotropic Character of the Dopes

The dopes of this invention are optically anisotropic, i.e., microscopic regions of a given dope are birefringent; a bulk dope sample depolarizes plane-polarized light because the light transmission properties of the microscopic areas of the dope vary with direction. This characteristic is associated with the existence of at least part of the dopes in the liquid crystalline or mesomorphic state. The liquid crystalline state of the dopes of this invention is of the nematic type.

The dopes of this invention which exhibit optical anisotropy do so while the dopes are in the relaxed state. This is in contrast to conventional polymer solutions which may be caused to depolarize plane-polarized light when subjected to appreciable shear.

There is a complex relationship existing among, e.g., the concentration of the particular polymer or copolymer species, the inherent viscosity thereof, the solvent system, and the dope temperature which generally determines the ranges in which a given dope is anisotropic or isotropic. A useful polymer concentration dope viscosity relationship exists for given polymer-solvent combinations which are capable of forming the anisotropic dopes of this invention. For such combinations, the dope formed is isotropic when the polymer concentration is below a particular level. As the concentration of the polymer is increased, the viscosity of the dope increases. However, at a point identified herein as the "critical concentration point" there is a sharp discontinuity in the slope of the viscosity v. concentration curve when the dope changes from isotropic to partially anisotropic without the formation of a solid phase. Further addition of polymer results in a decrease in the viscosity of the dope as it becomes more anisotropic. Illustrative viscosity vs. concentration curves of this type are shown in Kwolek U.S. 3,671,542. The "critical concentration point" (as well as the complete viscosity vs. concentration curve) is routinely determined using conventional concentration and viscosity measuring techniques (see Kwolek U.S. 3,671,542).

Another qualitative determination of the anisotropic character of these dopes may be made with the naked eye. These dopes may appear turbid or hazy and yet contain no, or practically no undissolved solid. When the dope, seen under reflected ordinary light, is disturbed by shaking or rolling the vessel containing the dope or by only slow stirring, there is produced a characteristic, readily observed, satin-like sheen or glow which is observed even after the disturbance ceases, and which decreases in intensity thereafter. This may be described as being a pearly or opalescent quality of the dope. Dopes which are disturbed as described above often give the appearance of having striations and/or graininess in the surface. These visual effects are observed in the anisotropic dopes of this invention. This may commonly be referred to as "stir opalescence." Further details on qualitative and quantitative determinations of optical anisotropy are presented in Kwolek U.S. 3,671,542. The latter patent describes the improved properties (e.g., higher tenactiy and initial modulus) of fibers spun from anisotropic, rather than isotropic systems.

Fiber Preparation

The dopes may be formed into fibers of high quality by spinning them into suitable baths such as by wet and "air-gap" spinning techniques, using spinnerets and other apparatus constructed of materials resistant to the strong acids used. In "air-gap" spinning the spinneret is located in air or in an inert gaseous medium a short distance (e.g., 0.1 to 10 cm., preferably from about 0.5 to 2 cm.) above the surface of a coagulating bath. Spinning of polyacrylonitrile fibers by one working of this general technique is described in, e.g., Ucci U.S. 3,080,210. A variety of baths may be used to coagulate the extruded dope into fibers. The baths may be, e.g., water, as shown in the examples, or a dilute solution of sulfuric acid. Preferably, the temperature of a coagulation bath is room temperature or below.

It is desirable to completely remove the spinning solvent from fiber samples prepared from the dopes of this invention. Water alone or aqueous alkaline solutions may be used for removal of the residual acid. A convenient method is to spray the threadline as it leaves the coagulating bath with an aqueous alkaline solution (e.g., saturated sodium bicarbonate), remove the surface liquid from the threadline with a wiping device (e.g., a sponge) or a jet, wash with water and/or aqueous alkaline solutions to reduce the acid content, and wind up the fibers on bobbins. The fibers may be soaked in water for a period sufficient to remove the acid. The thoroughly washed fibers may be dried on the bobbin in the area of temperatures of up to about 110° C. They can also be conveniently dried on heated rolls.

It will be understood that the usual additives such as dyes, fillers, antioxidants, etc., can be incorporated into the dopes of this invention for the purpose intended, prior to shaped article preparation.

The fibers prepared from the polymers of this invention exhibit high values of tensile properties, especially in the as-extruded state, i.e., without subsequent hot drawing or annealing. As-extruded fibers spun from the anisotropic dopes of formula (I) polyamides and copolyamides, exhibit tenacity and initial modulus values (measured as described hereinafter) of at least 3 g.p.d. and 100 g.p.d., respectively, preferably of at least about 5 g.p.d. and 200 g.p.d., respectively. These as-extruded fibers exhibit orientation angles of less than about 50° C. and are useful in tire cords. The tensile properties of these as-extruded fibers can be enhanced by subjecting the undrawn fibers to a heat treatment.

Measurements and Tests

Inherent Viscosity: Inherent viscosity ($\eta_{inh}$) is defined by the following equation:

$$\eta_{inh} = \frac{\ln(\eta_{rel})}{C}$$

wherein ($\eta_{rel}$) represents the relative viscosity and C represents a concentration of 0.5 gram of the polymer in 100 ml. of solvent. The relative viscosity ($\eta_{rel}$) is determined by dividing the flow time in a capillary viscometer of a dilute solution of the polymer by the flow time for the pure solvent. The dilute solutions used herein for determining ($\eta_{rel}$) are of the concentration expressed by (C), above; flow times are determined at 30° C.; the solvent is sulfuric acid (96–98% sulfuric).

Fiber Tensile Properties: Filament properties are measured on fibers that have been conditioned at 21° C. and 65% relative humidity (R.H.) for at least 16 hours unless otherwise specified. Yarn properties are measured on yarn that has been conditioned at 24° C. and 55% R.H. for at least 16 hours. All measurements are made in the fiber conditioning environment.

Tenacity (breaking tenacity) (T), elongation (breaking elongation) (E), and initial modulus (Mi) are obtained from breaking a single filament or a multifilament yarn on an Instron tester (Instron Engineering Corp., Canton, Mass.).

Single filaments are broken with a gage length (distance between jaws) of 1.0 inch (2.54 cm.). The results on 3 filaments are averaged. Yarns are given 3 turns per inch (2.54 cm.) twist (under 0.1 g.p.d. tension) and broken with a 10 inch (25.4 cm.) gage length. All samples are elongated at a constant rate of extension (10% elongation/minute for fibers having an E of under 8%, and 60% elongation/minute for fibers with E of 8 to 100%) until the sample breaks.

The denier of a single filament (d.p.f.) is calculated from its functional resonant frequency, determined by vibrating a 7 to 9 cm. length of fiber under tension with changing frequency. (A.S.T.M. D1577–66, part 25, 1968) This filament is then used for 1 break.

The denier of yarn is determined by weighing a known length (at 0.1 g.p.d. tension); 90 cm. length is convenient.

The tenacity (grams/denier), elongation (percent), and initial modulus (gram/denier) as defined in A.S.T.M. D2101, part 25, 1968 are obtained from the load-elongation curve and the measured denier. In actual practice, the measured denier of the sample, test conditions, and sample identification are fed to a computer before the start of a test; the computer records the load-elongation curve of the fiber as it is broken and then calculates the fiber properties.

It should be noted that different values are obtained from single filaments (filament properties) and from multifilament strands (yarn properties) of the same sample. Unless specified otherwise all properties given herein are filament properties.

Orientation Angle: Orientation angle (O.A.) values for the fibers of this invention may be measured by the procedure described in Kwolek U.S. 3,671,542.

EXAMPLE 1

This example illustrates the preparation of poly(1,4-phenylene 2,5-pyridinedicarboxamide) and fibers thereof, spun from an optically anisotropic dope.

To a stirred solution of 1,4-phenylenediamine (5.4 g., 0.005 mole) in an ice-cooled mixture of HMPA/NMP (270 ml./30 ml.) is added 2,5-pyridinedicarbonyl chloride (10.2 g., 0.005 mole). The cooling bath is removed after 15 min. and stirring of the clear, viscous solution is continued. In another 1 hour and 45 minutes the reaction mixture, now at room temperature, is difficulty stirrable. Lithium carbonate (3.7 g.) is added. After an additional hour, there results a clear, viscous stirrable solution. This is combined with water to precipitate the polymer which is collected, washed separately with water and with methanol, and dried in vacuo at 80° C. The dried polymer (A) exhibits an inherent viscosity of 5.2.

The above-described reaction is repeated, but with the reactants at twice the previous amounts and with solvents in the proportions of 500 ml./50 ml., respectively. The dried polymer (B) obtained from this particular synthesis exhibits an inherent viscosity of 6.8.

An anisotropic spinning dope containing 10% by weight solids is prepared by combining 31 grams of the above-prepared polymers (11 g./20 g., A/B proportion) with 270 g. of concentrated sulfuric acid (96%), with stirring. This dope, maintained at 27° C., is placed in a wet-spinning cell and is extruded through a spinneret [10-hole, each hole of 0.003 inch (0.008 cm.) diameter, maintained at 27° C.] into an aqueous coagulating bath maintained at 25° C. and positioned ¼ inch vertically below the face of the spinneret. The fibers emerging from the bath are washed with water and are wound up at the rate of 370 ft./min. (113 m./min.). The fibers are extracted in water for 24 hours, then dried in air. The dried filaments exhibit the following tensile properties: T/E/Mi/Den.: 4.6/14.1/138.5/9.1; O.A.=37°.

EXAMPLE 2

This example illustrates the preparation of poly(chloro-1,4-phenylene 2,5-pyridinedicarboxamide) and dope thereof.

To a stirred solution of chloro-1,4-phenylenediamine (1.42 g., 0.01 mole) in an ice-cooled mixture of DMAc/HMPA (40 ml./18.5 ml.) in a tubular flask is added 2,5-pyridinedicarbonyl chloride (2.04 g., 0.01 mole). The reaction mixture quickly becomes viscous and turns into a clear gel. After 1 hour, lithium carbonate (0.74 g.) is added. A clear, viscous solution is formed. The solution is permitted to stand for two days, after which it is combined with water to precipitate the polymer which is collected, washed with water, and dried in vacuo at 80° C. The dried polymer exhibits an inherent viscosity of 1.95.

An anisotropic dope containing 17% by weight solids is prepared by combining 1.5 g. of the polymer shown above with 4 ml. of 100% sulfuric acid. This dope is strongly shear opalescent.

EXAMPLE 3

This example illustrates the preparation of poly(trans-1,4-cyclohexylene 2,5-pyridinedicarboxamide) and dope.

Trans-1,4-cyclohexanediamine (1.14 g., 0.01 mole) is dissolved in a solution of chloroform (38 ml.), water (125 ml.), and sodium carbonate (2.1 g.) in a Waring Blendor®. To this is added 2,5-pyridine dicarbonyl chloride (2.04 g., 0.01 mole) in chloroform (75 ml.). The combined ingredients are stirred together for five minutes, then combined with hexane to precipitate the polymer which is collected, washed well with water, and dried in vacuo at 80° C. The dried polymer exhibits an inherent viscosity of 1.05.

An anisotropic dope containing 15% solids is prepared by stirring together a sample of the above polymer (1.25 g.) with 4 ml. of 100% sulfuric acid.

EXAMPLE 4

This example illustrates the preparation of poly]1,4-phenylene bis(iminocarbonyl-1,4-phenylene) 2,5-pyridinedicarboxamide] and a dope thereof.

To a stirred combination of N,N'-bis(4-aminobenzoyl-1,4-phenylenediamine) (3.46 g., 0.01 mole) in an ice-cooled mixture of DMAc/HMPA (40 ml./18.5 ml.) is added 2,5-pyridinedicarbonyl chloride (2.04 g., 0.01 mole). A clear, viscous solution is obtained, in which a fine precipitate later begins to form. The reaction mixture is stirred for 1 hour, after which lithium carbonate (0.74 g.) is added. The reaction mixture is permitted to stand for two days, after which it is combined with water to precipitate polymer which is collected, washed with water, and dried in vacuo at 80° C. For the dried product, $\eta_{inh}=3.12$.

A smooth, viscous, anisotropic dope containing 12% solids is prepared by stirring together a sample of the above polymer (2.0 g.) and 8 ml. of 100% sulfuric acid.

EXAMPLE 5

This example illustrates the preparation of fibers of poly(1,4-phenylene 2,5-pyridinedicarboxamide) which are characterized by unusually high levels of tensile properties.

Four separate syntheses of poly(1,4-phenylene 2,5-pyridinedicarboxamide) are performed by the procedure illustrated in Example 1, above, but with the reactants and solvents being used in twice the amounts shown in Example 1 and with the lithium carbonate being added after 1 hour of reaction time. These syntheses provide polymer samples which exhibit the following inherent viscosity values: 6.13, 5.11, 6.15, and 5.84.

An anisotropic spinning dope containing 20% by weight solids is prepared by combining 25 g. amounts of each of the polymers described above with 400 g. of 99.9% sulfuric acid. The average inherent viscosity value for the combined samples of polymer is 5.80. The combined ingredients are transferred to the previously described twin-cell unit and are mixed thoroughly at 72° C. during the course of 45 min. (9 cycles) to form an anisotropic spinning dope. This dope, maintained at 72° C., is extruded through a spinneret [20-hole, each hole of 0.003 inch (0.008 cm.) diameter, maintained at 80° C.] into an aqueous coagulating bath maintained at 1° C. and positioned ¼ inch vertically below the face of the spinneret. The fibers emerging from the bath are washed with water and are wound up at the rate of 800 ft./min. (244 m./min.). The fibers are soaked in water for 16 hours, then soaked for 8 hours in an aqueous solution of potassium hydroxide (pH=8) and 2 soakings in water of 16 and 8 hours, respectively. The fibers are dried overnight at room temperature in an air-stream. The washed and dried filaments exhibit the following tensile properties: T/E/Mi/Den.: 17.98/5.8/471/3.51; O.A.=22°.

EXAMPLE 6

This example illustrates the preparation of poly(4,4'-carbonamidobiphenylene 2,5-pyridinedicarboxamide) and dope.

To a stirred solution of 4,4'-diaminobenzanilide (2.27 g., 0.01 mole) in an ice-cooled mixture of DMAc/HMPA (40 ml./18.5 ml.) in a tubular flask is added 2,5-pyridinedicarbonyl chloride (2.04 g., 0.01 mole). A clear, viscous solution quickly forms. After the solution is stirred for 1 hour, lithium carbonate (0.74 g.) is added. The contents of the reaction flask are then permitted to stand for two days at room temperature, after which they are combined with water to precipitate the polymer, which is collected, washed with water, and dried *in vacuo* at 80° C. The dried polymer exhibits an inherent viscosity of 6.84.

An optically anisotropic dope containing 12% solids is formed by dissolving the polymer in 100% sulfuric acid at about 60° C. in the ratio of 1 g./4 ml. This dope becomes solid after cooling to 25° C.

EXAMPLE 7

This example illustrates the preparation of poly(3,3'-dimethyl - 4,4'-biphenylene 2,5 - pyridinedicarboxamide) and dope.

The procedure of Example 6, above, is followed but with the following changes: the diamine employed is 3,3'-dimethylbenzidine (2.12 g., 0.01 mole), the solvent system is HMPA/NMP (25 ml./25 ml.), and the reaction mixture is stirred for only one hour after addition of the lithium carbonate before the polymer is isolated. The polymer obtained exhibits an inherent viscosity of 1.53.

An optically anisotropic dope containing 14.6% solids is formed at 25° C. by dissolving the polymer in 100% sulfuric acid in the ratio of 1 g./3.2 ml.

EXAMPLE 8

This example illustrates the preparation of poly(1,4-phenylene 2,5-pyridinedicarboxamide) fibers by wet spinning an anisotropic dope.

To a stirred solution of 1,4-phenylenediamine (5.4 g., 0.005 mole) in an ice-cooled mixture of DMAc/HMPA (200 ml./92.5 ml.) is added 2,5-pyridinecarbonyl chloride (10.2 g., 0.005 mole). The cooling bath is removed after 15 minutes, stirring is continued, and lithium carbonate (3.7 g.) is added after 1 hour. The viscous solution obtained is permitted to stand at autogenous temperature for about 65 hours, after which it is combined with water to precipitate the polymer which is collected, washed well with water, and dried *in vacuo* at 80° C. The dried polymer (A) exhibits an inherent viscosity of 3.24.

The above-described reaction is repeated, with the exception that the viscous solution obtained after addition of the lithium carbonate is permitted to stand only overnight before the polymer is isolated. The dried polymer (B) obtained from this synthesis exhibits an inherent viscosity of 3.93.

An anisotropic spinning dope is prepared by first combining 15 grams of the above-prepared polymers (10 g. of "A," 5 g. of "B") with 135 g. of concentrated sulfuric acid (98%), with stirring, to form a viscous dope. An additional 10 grams of the sulfuric acid are added to form a smooth, viscous, anisotropic dope containing 9.4% by weight solids. This dope is placed in a wet spinning cell and is extruded through a spinneret [60-hole, each hole of 0.002 inch (0.005 cm.) diameter] into a water bath maintained at 30° C. The emerging fibers are wound up at 207 ft./min. (63 m./min.). The fibers are extracted in water overnight and dried in air. The washed and dried filaments exhibit the following properties T/E/Mi: 2.9/19.1/91.3.

What is claimed is:
1. Polymer consisting essentially of repeating units of the formula

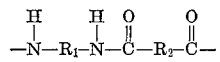

wherein $R_1$ represents at least one radical selected from the group of 1,4-phenylene; methyl-, chloro-, bromo- and fluoro-1,4-phenylene; 4,4'-biphenylene; 3,3'-dichloro-4,4'-biphenylene; 3,3'-dimethoxy-4,4'-biphenylene; 3,3'-dimethyl-4,4'-biphenylene; *trans*-1,4-cyclohexylene; 4,4'-carbonamidobiphenylene; and 1,4-phenylene bis(iminocarbonyl)-1,4-phenylene; and $R_2$ represents 2,5-pyridylene or 4-methyl-2,5-pyridylene radicals, of which 0 to about 50 mole percent may be replaced by radicals selected from the group of 1,4-phenylene, chloro-1,4-phenylene, and 4,4'-biphenylene, said polymer having an inherent viscosity of at least 1.0 as measured at a concentration of 0.5 gram of polymer in 100 ml. of sulfuric acid (96–98% sulfuric) at 30° C.

2. The polymer of Claim 1 wherein $R_1$ is 1,4-phenylene.
3. The polymer of Claim 1 wherein $R_2$ is 2,5-pyridylene.
4. An anisotropic dope consisting essentially of from about 7–20% by weight, in sulfuric acid of a concentration in the range of 93–105% $H_2SO_4$, of a fiber-forming polyamide having an inherent viscosity of at least 1.0 as measured at a concentration of 0.5 gram of polymer in 100 ml. of sulfuric acid (96–98% sulfuric) at 30° C., said polymer consisting essentially of repeating units of the formula:

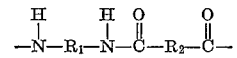

wherein $R_1$ represents at least one radical selected from the group of 1,4-phenylene; methyl-, chloro-, bromo- and fluoro-1,4-phenylene; 4,4'-biphenylene; 3,3'-dichloro-4,4'-biphenylene; 3,3' - dimethoxy - 4,4'-biphenylene; 3,3'-dimethyl-4,4'-biphenylene; *trans*-1,4-cyclohexylene; 4,4'-carbonamidobiphenylene; and 1,4-phenylene bis(iminocarbonyl)-1,4-phenylene; and $R_2$ represents 2,5-pyridylene or 4-methyl-2,5-pyridylene radicals, of which 0 to about 50 mol percent may be replaced by radicals selected from the group of 1,4-phenylene, chloro-1,4-phenylene, and 4,4'-biphenylene.

References Cited
UNITED STATES PATENTS

| | | | |
|---|---|---|---|
| 3,562,220 | 2/1971 | McMillian | 260—78 |
| 3,154,613 | 10/1969 | Epstein | 264—184 |
| 3,671,542 | 6/1972 | Kwolek | 260—30.8 R |

FOREIGN PATENTS 830,799  1960  Great Britain.

OTHER REFERENCES

Terenter et al., Polymer Science (U.S.S.R.), 4, 1556–1560 (1963).

Sarzhevskaya et al. Ukr. Khim. Zh 29(5), 523–6 (1963).

ALLAN LIEBERMAN, Primary Examiner

R. ZAITLEN, Assistant Examiner

U.S. Cl. X.R.

260—78R